March 11, 1924.
T. P. LONG
LAND MARKER
Filed Aug. 7, 1922
1,486,530
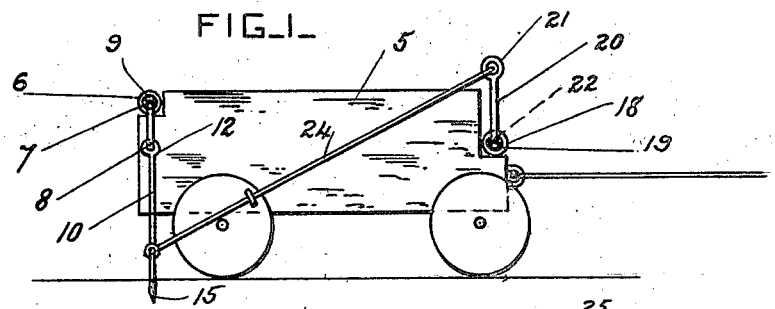
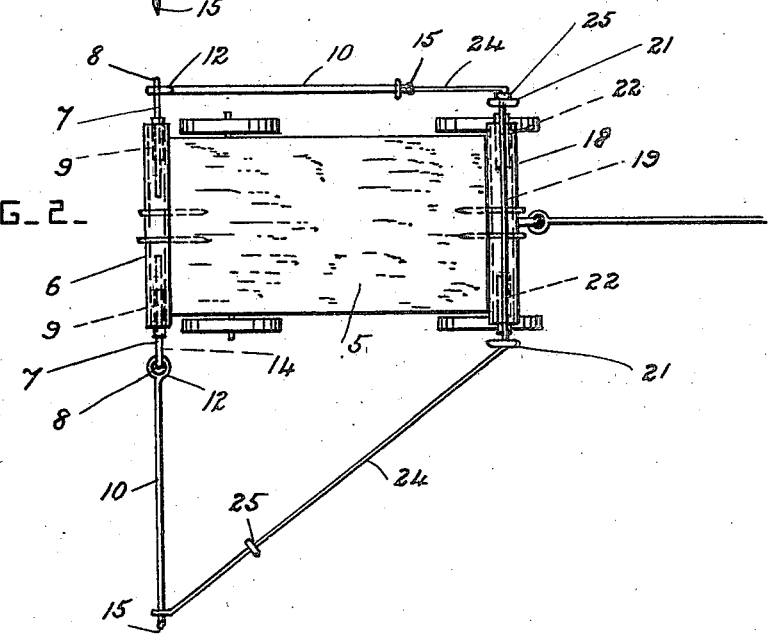
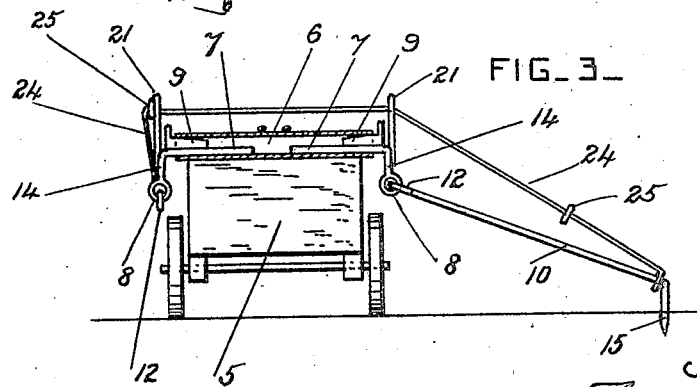
Inventor
Thomas P. Long
by Herbert W. Jenner
Attorney.

Patented Mar. 11, 1924.

1,486,530

UNITED STATES PATENT OFFICE.

THOMAS PATRICK LONG, OF HARMON, ILLINOIS.

LAND MARKER.

Application filed August 7, 1922. Serial No. 580,164.

*To all whom it may concern:*

Be it known that I, THOMAS P. LONG, a citizen of the United States, residing at Harmon, in the county of Lee and State of Illinois, have invented certain new and useful Improvements in Land Markers, of which the following is a specification.

This invention relates to markers used for marking land in connection with planting corn and other crops which are grown in rows spaced at predetermined distances apart; and it consists in the novel construction and combination of the parts hereinafter fully described and claimed.

In the drawings, Figure 1 is a side view of a land marker constructed according to this invention. Fig. 2 is a plan view of the same. Fig. 3 is a rear end view partially in section.

A truck or carriage 5 is provided. It is preferably a wheeled carriage adapted to be drawn along, and it may be the carriage of any approved form of seed planting machine.

A tube 6 is secured crosswise of the carriage at its rear end, and 7 are stub shafts inserted in the end portions of the tube 6 and slidable longitudinally. The stub shafts 7 have eyes 8 at their outer ends, and they are preferably secured in the tube by wedges 9 after they have been adjusted longitudinally.

Arms 10 are pivoted by eyes 12 to the eyes 8 of the stub shafts, and the stub shafts preferably have cranked end portions 14, so that the height of the arms 10 above the ground can be regulated. The tube 6 may be a portion of the mechanism of the planting machine. When a tube 6 is specially provided it may be necessary to secure it to the carriages of existing planting machines at various heights above the ground. The arms 10 have downwardly projecting marking points or blades 15 at their free ends. When the tube 6 is a part of an existing planting machine the use of wedges 9 enables the stub shafts to be secured in the tube without changing it in any way or drilling holes in it.

When a tube 6 is added to a planting machine, any other form of fastening device, such as a pin or set-screw can be used instead of a wedge.

A second tube 18 is secured crosswise of the carriage at its front end, and a rod 19 is inserted in this tube and has radially projecting arms 20 at its ends provided with guide eyes 21. The rod 19 is secured by wedges 22, or other approved fastening devices, and it can be turned on its axis in the tube to adjust the positions of the guide eyes. A cord 24 is passed through the guide eyes 21, and its ends are secured to the free end portions of the arms 10. The cord has stops 25 on its end portions which engage with the eyes 21, and the markers are used alternately, one marker being raised and supported by the cord, as shown, when the other marker is at work.

The arms 20 are adjusted so as to compensate for the adjustments of the stub shafts, and they enable the same cord 24 to be used without changing its length. The arms 20 are also adjusted to suit the working parts of existing planting machines, so that the cord will work without obstruction.

What I claim is:

In a land marker, a carriage, a rear tube secured to the carriage, longitudinally and circumferentially adjustable stub shafts mounted in the rear tube and having downwardly projecting arms at their ends, marker arms pivoted to the said arms, a front tube also secured to the carriage, a rod circumferentially adjustable in the front tube and provided with upwardly projecting arms at its ends having guide eyes at their ends, and a flexible connection slidable in the said guide eyes and having its ends secured to the marker arms.

In testimony whereof I have affixed my signature.

THOMAS PATRICK LONG.